US012259196B2

United States Patent
Flett et al.

(10) Patent No.: US 12,259,196 B2
(45) Date of Patent: Mar. 25, 2025

(54) SOUND-ATTENUATING HEAT EXCHANGERS AND METHODS OF EXCHANGING HEAT AND ATTENUATING SOUND WITHIN SOUND-ATTENUATING HEAT EXCHANGERS

(71) Applicant: The Boeing Company, Chicago, IL (US)

(72) Inventors: Derek William Flett, Tulalip, WA (US); David W. Foutch, Seattle, WA (US); Justin Honshune Lan, Bothell, WA (US); James W. Peck, West Lafayette, IN (US)

(73) Assignee: The Boeing Company, Arlington, VA (US)

( * ) Notice: Subject to any disclaimer, the term of this patent is extended or adjusted under 35 U.S.C. 154(b) by 389 days.

(21) Appl. No.: 17/842,552

(22) Filed: Jun. 16, 2022

(65) Prior Publication Data
US 2023/0408203 A1     Dec. 21, 2023

(51) Int. Cl.
*F28D 9/00*    (2006.01)
*F02K 3/00*    (2006.01)
(Continued)

(52) U.S. Cl.
CPC .............. *F28D 9/0025* (2013.01); *F02K 3/00* (2013.01); *F28F 3/02* (2013.01); *F28F 13/06* (2013.01);
(Continued)

(58) Field of Classification Search
CPC .. F28D 9/0025; F28D 2021/0021; F02K 3/00; F02K 1/827; F28F 3/02;
(Continued)

(56) References Cited

U.S. PATENT DOCUMENTS 1,768,222 A    6/1930  Uhde
2,886,121 A    5/1959  Welbourn
(Continued)

FOREIGN PATENT DOCUMENTS

EP    2472067 A1    7/2012
EP    2775244 A1    9/2014
(Continued)

OTHER PUBLICATIONS

Exxentis Porous Aluminium Heat Exchanger: www.exxentis.co.uk/porous-aluminium/applications/heat-exchanger; available since at least Mar. 11, 2022.
(Continued)

*Primary Examiner* — Steve S Tanenbaum
(74) *Attorney, Agent, or Firm* — Kolitch Romano Dascenzo Gates LLC

(57) ABSTRACT

Sound-attenuating heat exchangers and methods of exchanging heat and attenuating sound within sound-attenuating heat exchangers. The sound-attenuating heat exchangers include a base region, which defines a first base side and a second base side, and a plurality of elongate fluid conduits, which are at least partially defined by the base region and configured to contain a cooled fluid stream. The sound-attenuating heat exchangers also include a plurality of heat transfer-enhancing structures, which extend from the first base side and are configured to exchange thermal energy with a cooling fluid stream, and a sound-attenuating region, which extends from the second base side. The sound-attenuating region includes a plurality of resonator cells configured to attenuate sound and a plurality of resonator cell openings. Each resonator cell opening opens from a corresponding resonator cell toward the plurality of heat transfer-enhancing structures. The methods include methods of operating the sound-attenuating heat exchanger.

21 Claims, 9 Drawing Sheets

(51) Int. Cl.
*F28D 21/00* (2006.01)
*F28F 3/02* (2006.01)
*F28F 13/06* (2006.01)

(52) U.S. Cl.
CPC ...... *F05D 2260/20* (2013.01); *F05D 2260/96* (2013.01); *F28D 2021/0021* (2013.01); *F28F 2265/28* (2013.01)

(58) Field of Classification Search
CPC ... F28F 13/06; F28F 2265/28; F05D 2260/20; F05D 2260/96; F05D 2260/963; F02C 7/24
USPC .......................................................... 165/256
See application file for complete search history.

(56) References Cited

U.S. PATENT DOCUMENTS

| | | | |
|---|---|---|---|
| 2,988,302 A | 6/1961 | Smith | |
| 3,205,939 A | 9/1965 | Huet | |
| 3,229,762 A | 1/1966 | Vollhardt | |
| 4,060,127 A | 11/1977 | Savin et al. | |
| 4,151,710 A | 5/1979 | Griffin et al. | |
| 4,203,392 A | 5/1980 | McLane | |
| 4,266,602 A | 5/1981 | White et al. | |
| 4,298,090 A | 11/1981 | Chapman | |
| 4,790,624 A | 12/1988 | Van Hoye et al. | |
| 5,544,703 A | 8/1996 | Joel et al. | |
| 5,743,488 A * | 4/1998 | Rolston | B64D 33/02 244/53 B |
| 8,820,477 B1 | 9/2014 | Herrera et al. | |
| 10,436,118 B2 | 10/2019 | Weaver et al. | |
| 10,480,412 B2 | 11/2019 | Zebian | |
| 10,619,570 B2 | 4/2020 | Foutch et al. | |
| 11,060,480 B2 | 7/2021 | Foutch et al. | |
| 11,353,240 B2 * | 6/2022 | Schiller | B60R 13/08 |
| 2002/0179773 A1 * | 12/2002 | Breer | B64D 15/04 244/134 R |
| 2005/0187612 A1 | 8/2005 | Edwin | |
| 2007/0034447 A1 | 2/2007 | Proscia et al. | |
| 2010/0263964 A1 | 10/2010 | Kosaka et al. | |
| 2011/0126544 A1 * | 6/2011 | Foster | F02K 3/06 181/213 |
| 2011/0185731 A1 | 8/2011 | Mylesmans | |
| 2013/0020061 A1 | 1/2013 | Bergh | |
| 2013/0055718 A1 | 3/2013 | Bodard et al. | |
| 2013/0251510 A1 | 9/2013 | Runyan | |
| 2014/0209408 A1 | 7/2014 | Morvant | |
| 2015/0233580 A1 | 8/2015 | Olsen et al. | |
| 2015/0315972 A1 | 11/2015 | Lumbab et al. | |
| 2016/0040942 A1 | 2/2016 | Dziubinski et al. | |
| 2017/0089238 A1 * | 3/2017 | Leyko | B23P 19/00 |
| 2017/0234144 A1 | 8/2017 | Mugglestone | |
| 2017/0248372 A1 | 8/2017 | Erno et al. | |
| 2017/0276440 A1 | 9/2017 | Kenworthy et al. | |
| 2017/0292795 A1 * | 10/2017 | Waissi | F02C 7/14 |
| 2017/0301334 A1 | 10/2017 | Nampy | |
| 2017/0321603 A1 * | 11/2017 | Zebian | F02K 1/827 |
| 2018/0230911 A1 | 8/2018 | Pastouchenko et al. | |
| 2018/0231027 A1 | 8/2018 | Pastouchenko et al. | |
| 2019/0024987 A1 | 1/2019 | Moore et al. | |
| 2019/0112066 A1 | 4/2019 | Alonso-Miralles | |
| 2019/0145318 A1 * | 5/2019 | Foutch | F02C 7/14 415/177 |
| 2019/0145348 A1 | 5/2019 | Foutch et al. | |
| 2020/0408107 A1 * | 12/2020 | Foutch | F02K 1/34 |

FOREIGN PATENT DOCUMENTS

| | | |
|---|---|---|
| EP | 2894323 A1 | 7/2015 |
| EP | 3023724 A1 | 5/2016 |
| EP | 3121429 A1 | 1/2017 |
| EP | 3483413 A1 | 5/2019 |
| FR | 2549585 A1 | 4/1986 |
| GB | 588520 | 5/1947 |
| GB | 2106190 A | 4/1983 |
| GB | 2476855 A | 7/2011 |
| JP | 6026181 A | 2/1985 |
| JP | 07167036 A | 7/1995 |
| JP | 10176651 A | 6/1998 |
| KR | 20130103692 A | 9/2013 |
| WO | WO 2011115883 A2 | 9/2011 |
| WO | WO 2014068326 A1 | 5/2014 |
| WO | WO 2014151685 A1 | 9/2014 |
| WO | WO 2017052798 A1 | 3/2017 |
| WO | WO 2017117088 A1 | 7/2017 |

OTHER PUBLICATIONS

Kiwan, S., and Al-Nimr, M. A. (Jul. 14, 2000). "Using Porous Fins for Heat Transfer Enhancement." ASME. J. Heat Transfer. Aug. 2001; 123(4): 790-795. https://doi.org/10.1115/1.1371922.
Unison Thermal Management: www.unisonindustries.com/mechanical/thermal-management/; available since at least Mar. 11, 2022.
Safran LEAP-1B engine for single-aisle commercial jets: www.safran-group.com/products-services/leap-1b-new-generation-engine-single-aisle-commercial-jets; available since at least Aug. 16, 2021.
Machine-generated English language translation of the abstract of EP 2472067 A1, downloaded from Espacenet.com Mar. 29, 2021.
Machine-generated English translation of the abstract for FR 2549585 A1, downloaded from Espacenet.com Jun. 10, 2019.
Machine-generated English language translation of the abstract of JP 6026181 A, downloaded from Japan Patent Office Feb. 10, 2021.
Machine-generated English language translation of the abstract of JP 07167036 A, downloaded from Japan Patent Office Feb. 10, 2021.
Machine-generated English language translation of the abstract of JP 10176651 A, downloaded from Japan Patent Office Feb. 10, 2021.
Machine-generated English language translation of the abstract of KR 20130103692 A, downloaded from Japan Patent Office Feb. 10, 2021.
European Patent Office, Extended European Search Report for related European patent application EP 23 17 0996, (Oct. 12, 2023).

* cited by examiner

SOUND-ATTENUATING HEAT EXCHANGERS AND METHODS OF EXCHANGING HEAT AND ATTENUATING SOUND WITHIN SOUND-ATTENUATING HEAT EXCHANGERS

FIELD

The present disclosure relates generally to sound-attenuating heat exchangers and/or to methods of exchanging heat and attenuating sound within sound-attenuating heat exchangers.

BACKGROUND

Heat exchangers may be utilized to exchange thermal energy, or heat, between a first fluid stream and a second fluid stream while maintaining fluid isolation between the two fluid streams. Often, the first fluid is a readily available fluid, such as water or air, and the second fluid is a heat exchange fluid that flows within a closed loop and is utilized to cool a cooled component. Examples of heat exchange fluids include water, hydrocarbon fluids, fluorocarbon fluids, and/or refrigerants.

In some systems, such as jet engines for aircraft, it also may be desirable to attenuate, or decrease a magnitude of sound, generated by the systems. In some such systems, space may be extremely limited and competing system priorities may dictate the maximum size, the shape, and/or the positioning of heat exchangers and/or sound-attenuating structures. These variables may create trade-offs with other components of the system. Thus, there exists a need for improved sound-attenuating heat exchangers and/or for methods of exchanging heat and attenuating sound within sound-attenuating heat exchangers.

SUMMARY

Sound-attenuating heat exchangers and methods of exchanging heat and attenuating sound within sound-attenuating heat exchangers are disclosed herein. The sound-attenuating heat exchangers include a base region that defines a first base side and a second base side. The sound-attenuating heat exchangers also include a plurality of elongate fluid conduits at least partially defined by the base region and configured to contain a cooled fluid stream. The sound-attenuating heat exchangers further include a plurality of heat transfer-enhancing structures extending from the first base side and configured to exchange thermal energy with a cooling fluid stream. The sound-attenuating heat exchangers also include a sound-attenuating region that extends from the second base side. The sound-attenuating region includes a plurality of resonator cells, which are configured to attenuate sound, and a plurality of resonator cell openings. Each resonator cell opening of the plurality of resonator cell openings opens from a corresponding resonator cell toward the plurality of heat transfer-enhancing structures.

The methods include flowing a cooling fluid stream through a plurality of heat transfer-enhancing structures that extend from a first base side of a base region of a sound-attenuating heat exchanger. The methods also include receiving, into a plurality of resonator cells and via a plurality of resonator cell openings, a sound wave that propagates within the cooling fluid stream. The methods further include attenuating the sound wave within the sound-attenuating region and receiving, with a plurality of elongate fluid conduits, a cooled fluid stream. The methods also include maintaining fluid separation between the cooling fluid stream and the cooled fluid stream within the sound-attenuating heat exchanger.

DESCRIPTION

Figure 1:
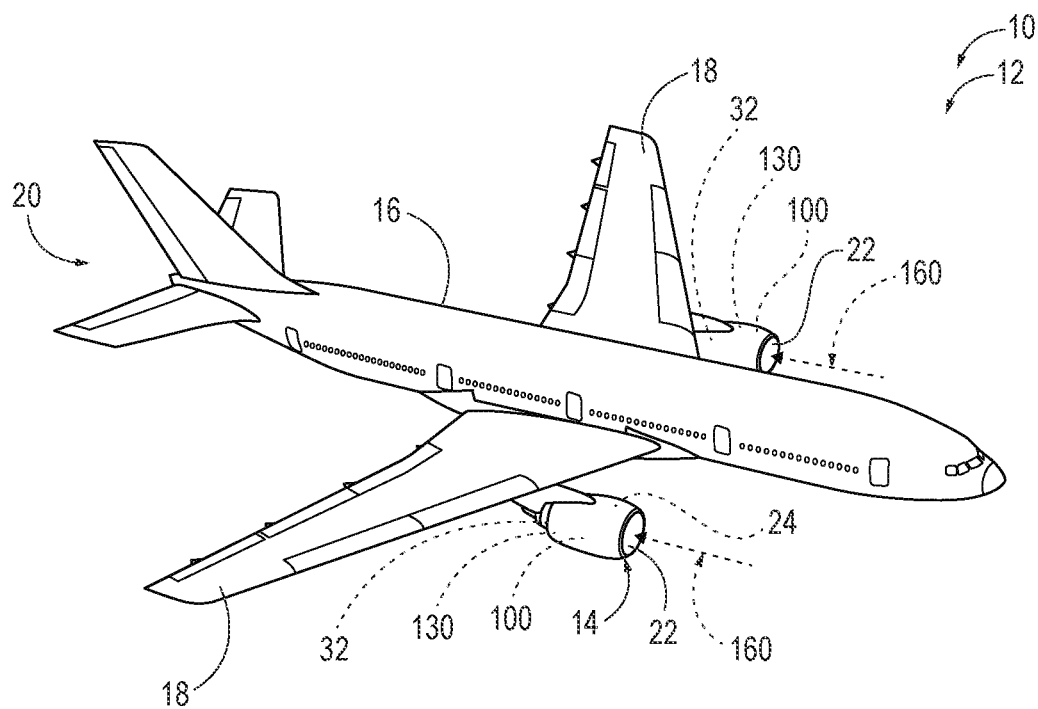
FIG. 1 is a schematic illustration of examples of a structure, in the form of an aircraft, that may include sound-attenuating heat exchangers and/or that may perform methods, according to the present disclosure.

FIGS. 1-10 provide illustrative, non-exclusive examples of sound-attenuating heat exchangers 100, of systems 10 that may include sound-attenuating heat exchangers 100, and/or of methods 300, according to the present disclosure. Elements that serve a similar, or at least substantially similar, purpose are labeled with like numbers in each of FIGS. 1-10, and these elements may not be discussed in detail herein with reference to each of FIGS. 1-10. Similarly, all elements may not be labeled in each of FIGS. 1-10, but reference numerals associated there with may be utilized herein for consistency. Elements, components, and/or features that are discussed herein with reference to one or more of FIGS. 1-10 may be included in and/or utilized with any of FIGS. 1-10 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a particular embodiment without departing from the scope of the present disclosure.

Figure 2:
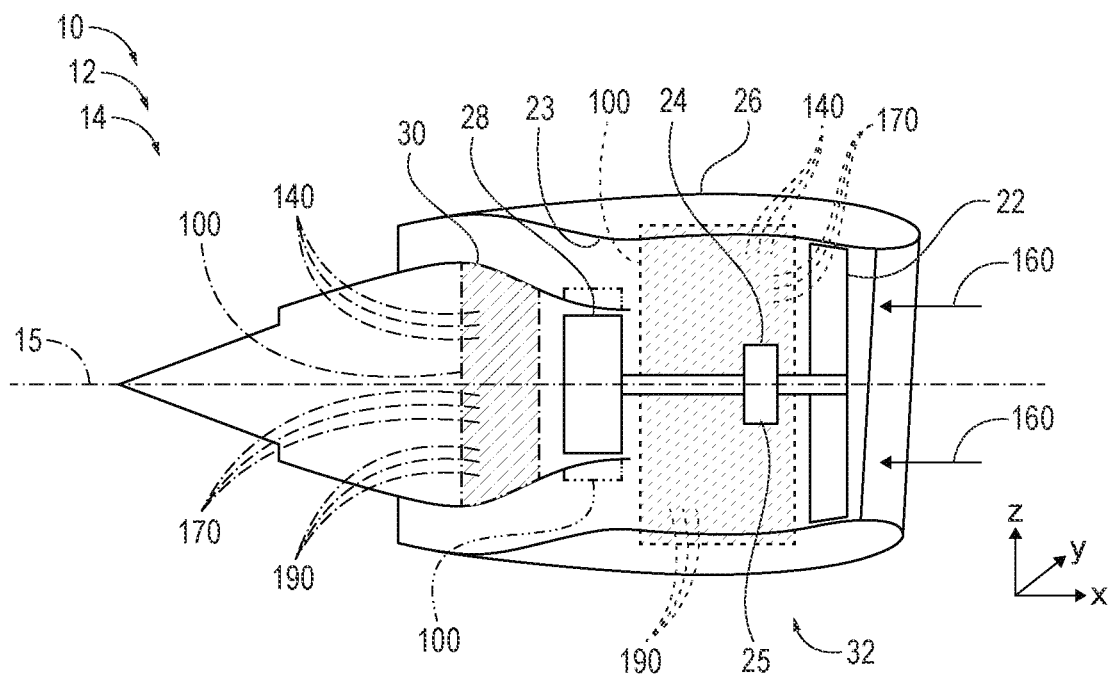
FIG. 2 is a schematic illustration of examples of a jet engine installation that may include sound-attenuating heat exchangers and/or that may perform methods, according to the present disclosure.

FIG. 1 is a schematic representation of a system 10, such as an aircraft 12, that may include a jet engine 14, that may include and/or utilize sound-attenuating heat exchangers 100, according to the present disclosure. FIG. 2 is a schematic cross-sectional view of jet engine 14. Jet engine 14 also may be referred to herein as and/or may be a jet engine assembly 14, a jet engine installation 14, and/or a jet engine and nacelle assembly 14. As illustrated in FIG. 1, systems 10 that include aircraft 12 may include an airframe 16, a plurality of wings 18, and a tail 20. Sound-attenuating heat exchangers 100, which are disclosed herein, may be utilized to exchange thermal energy between a cooling fluid stream 160 and a cooled fluid stream 130. As discussed in more detail herein, cooling fluid stream 160 may include and/or be air, or ambient air, that surrounds system 10 and/or that is compressed (e.g., compressed air) by a fan 22 of jet engine 14. In contrast, cooled fluid stream 130 may flow within a closed loop within system 10 and/or may be utilized to cool a cooled component 24 of system 10. Stated another way, system 10 may include a heat transfer system 32, sound-attenuating heat exchangers 100 may form a portion of heat transfer system 32, and cooled fluid stream 130 may flow in an enclosed loop within heat transfer system 32. Examples of cooled component 24 include one or more components of system 10, of aircraft 12, and/or of jet engine 14, such as a gear box, a bearing, and/or an electrical generator.

Turning now to FIG. 2, jet engines 14 that include sound-attenuating heat exchangers 100, which are disclosed herein, may include a nacelle 26 that surrounds, provides a housing for, and/or directs air into the jet engine. Jet engines 14 also may include a fan 22, which may provide initial compression of cooling fluid stream 160, such as air, that flows into the jet engine. Fan 22 may be driven by a turbine assembly 28 via a cooled component 24, such as a gear box 25. Turbine assembly 28 may be positioned within a turbine housing 30.

Sound-attenuating heat exchangers 100 may be positioned at any suitable location within jet engines 14. As an example, and as illustrated in dashed lines, sound-attenuating heat exchangers 100 may form, define, and/or be operatively attached to a portion of nacelle 26, such as an internal surface of the nacelle and/or a fan housing that is at least partially defined by, or operatively attached to, the nacelle.

As another example, sound-attenuating heat exchangers 100 may form, define, and/or be operatively attached to an internal surface of the turbine housing, as illustrated in dash-dot lines, and/or an external surface of the turbine housing, as illustrated in dash-dot-dot lines.

As discussed in more detail herein, sound-attenuating heat exchangers 100 include a plurality of heat transfer-enhancing structures 140. As also discussed more detail herein, heat transfer-enhancing structures 140 may project and/or extend from a first base side of a base region of sound-attenuating heat exchangers 100. This may include projection and/or extension away from walls of turbine housing 30, away from walls of nacelle 26, toward a central axis 15 of jet engine 14, toward turbine assembly 28, toward gear box 25, and/or toward fan 22. In some such examples, jet engine assembly 14 may be free of, or may not include, an aerodynamically shaped layer that extends between the plurality of heat transfer-enhancing structures 140 and central axis 15, turbine assembly 28, gear box 25, and/or fan 22. Such a configuration may provide improved heat transfer between cooling fluid stream 160 and heat transfer-enhancing structures 140 when compared to configurations in which the aerodynamically shaped layer does extend between the plurality of heat transfer-enhancing structures 140 and central axis 15, turbine assembly 28, gear box 25, and/or fan 22.

As also discussed in more detail herein, sound-attenuating heat exchangers 100 include a sound-attenuating region 170 that includes a plurality of resonator cell openings 190. In some such examples, heat transfer-enhancing structures 140 may be positioned between resonator cell openings 190 and central axis 15, turbine assembly 28, gear box 25, and/or fan 22.

The above-described relative orientation among the various components of sound-attenuating heat exchangers 100 with respect to components of jet engine 14 is illustrated by the coordinate system that is reproduced therein, with the Z-axis extending toward central axis 15, toward turbine assembly 28, toward gear box 25, and/or toward fan 22 of FIG. 2.

While FIGS. 1-2 illustrate sound-attenuating heat exchangers 100 being utilized in aircraft 12 and/or jet engines 14, it is within the scope of the present disclosure that sound-attenuating heat exchangers 100 may be utilized in and/or may form a portion of any suitable system 10, such as systems 10 for which there may be a desire to both exchange thermal energy and attenuate sound. Examples of such systems 10 include rocket engines, automobiles, and/or buildings.

Turning to FIGS. 3-9, sound-attenuating heat exchangers 100 include a base region 110 that defines a first base side 112 and a second base side 114. Sound-attenuating heat exchangers 100 also include a plurality of elongate fluid conduits 120, which are at least partially defined by base region 110 and are configured to contain a cooled fluid stream 130. Sound-attenuating heat exchangers 100 further include a plurality of heat transfer-enhancing structures 140, which extend from first base side 112 and are configured to exchange thermal energy with a cooling fluid stream 160. Stated differently, heat transfer-enhancing structures 140 extend in the Z-direction of FIGS. 3-9 and/or extend from first base side 112 and in the Z-direction.

Sound-attenuating heat exchangers 100 also include a sound-attenuating region 170. Sound-attenuating region 170 is positioned on, faces toward, and/or extends from second base side 114 and includes a plurality of resonator cells 174, which are configured to attenuate sound, and a plurality of resonator cell openings 190. Each resonator cell opening 190 opens from a corresponding resonator cell 174 and/or toward heat transfer-enhancing structures 140. Stated differently, each resonator cell opening 190 faces in the Z-direction of FIGS. 3-9. Stated still differently, each resonator cell opening 190 provides fluid communication between the corresponding resonator cell 174 and cooling fluid stream 160, such as to permit sound-attenuating region 170 and/or resonator cells 174 thereof to attenuate sound within cooling fluid stream 160. In some examples, a single, or only a single, resonator cell opening 190 opens from a given resonator cell 174. Alternatively, and in some examples, a plurality of resonator cell openings 190 opens from the given resonator cell 174 and/or toward heat transfer-enhancing structures 140. As examples, 2, 3, 4, 5, 6, or more than 6 resonator cell openings 190 may open from the given resonator cell 174.

Figure 10:
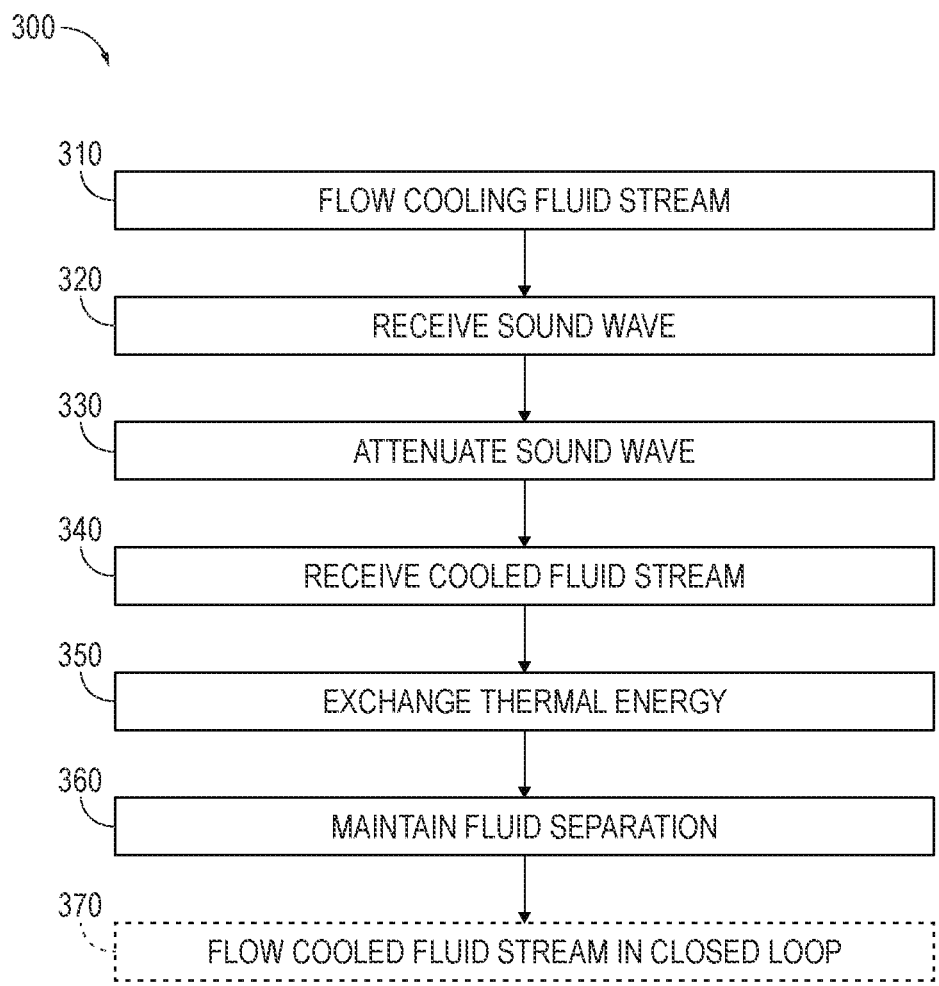
FIG. 10 is a flowchart depicting examples of methods of exchanging heat and attenuating sound with a sound-attenuating heat exchanger, according to the present disclosure.

During operation of sound-attenuating heat exchangers 100, and as discussed in more detail herein with reference to methods 300 of FIG. 10, cooling fluid stream 160 may flow through, across, and/or between heat transfer-enhancing structures 140. Concurrently, cooled fluid stream 130 may flow within elongate fluid conduits 120, and sound-attenuating heat exchangers 100 may facilitate exchange of thermal energy between cooling fluid stream 160 and cooled fluid stream 130. As an example, cooled fluid stream 130 may have a cooled fluid stream temperature that is greater than a cooling fluid stream temperature of cooling fluid stream 160. In this example, sound-attenuating heat exchangers 100 may conduct thermal energy from cooled fluid stream 130 to cooling fluid stream 160 via base region 110 and heat transfer-enhancing structures 140, thereby cooling cooled fluid stream 130.

In addition, a fraction of cooling fluid stream 160 may be received within resonator cells 174 via resonator cell openings 190. As discussed in more detail herein, receipt of the fraction of cooling fluid stream 160 will cause resonator cells 174 to attenuate sound waves, which propagate within cooling fluid stream 160, thereby attenuating sound and/or noise within the cooling fluid stream.

Sound-attenuating heat exchangers 100, according to the present disclosure, may be designed and/or configured a variety of manners. As an example, and with reference to FIGS. 3-6, resonator cell openings 190 may be defined and/or may extend within base region 110. In some such examples, resonator cell openings 190 may extend, or may be referred to herein as extending, between first base side 112 and second base side 114.

Figure 4:
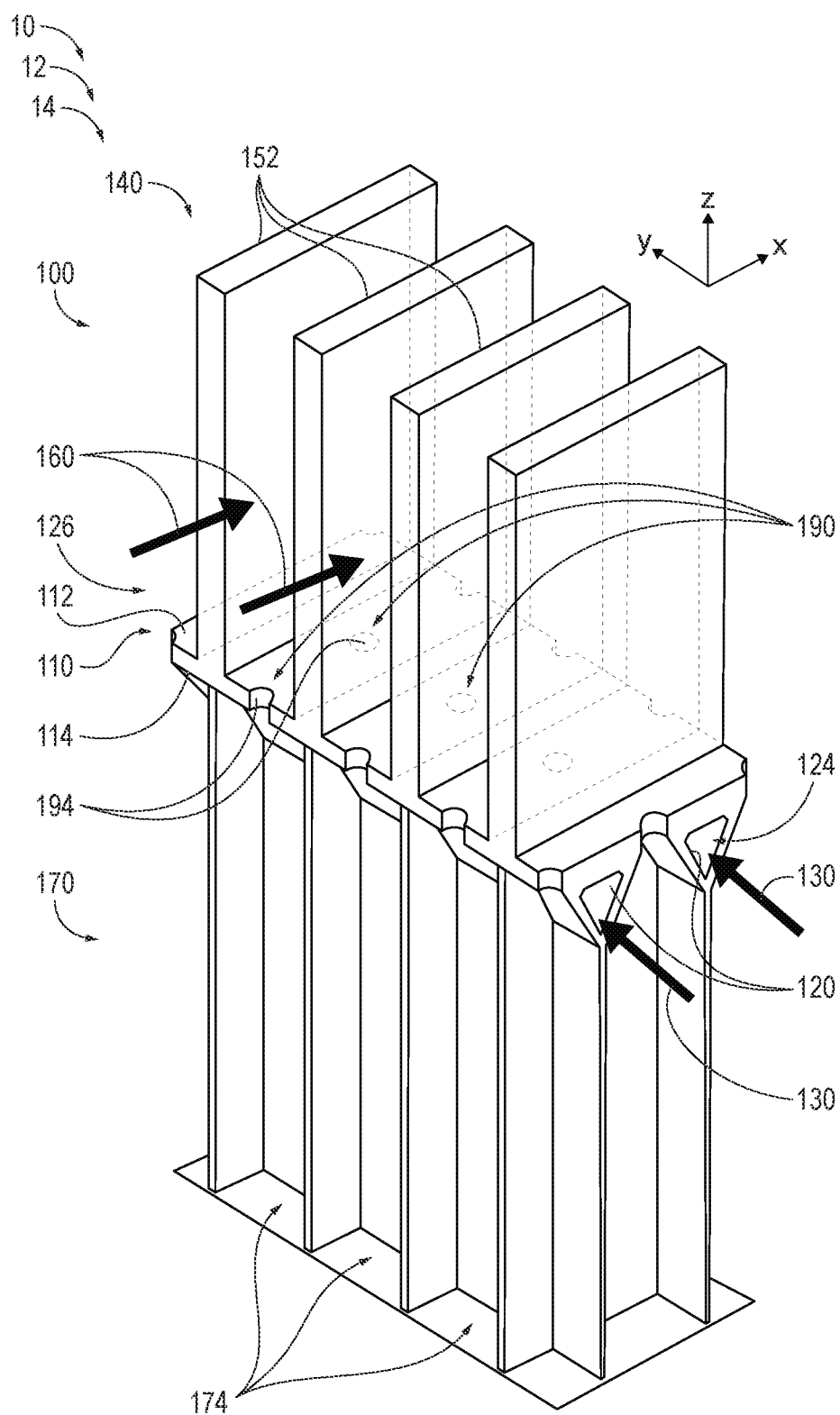
FIG. 4 is a less schematic illustration of an example of a sound-attenuating heat exchanger according to the present disclosure.
Figure 5:
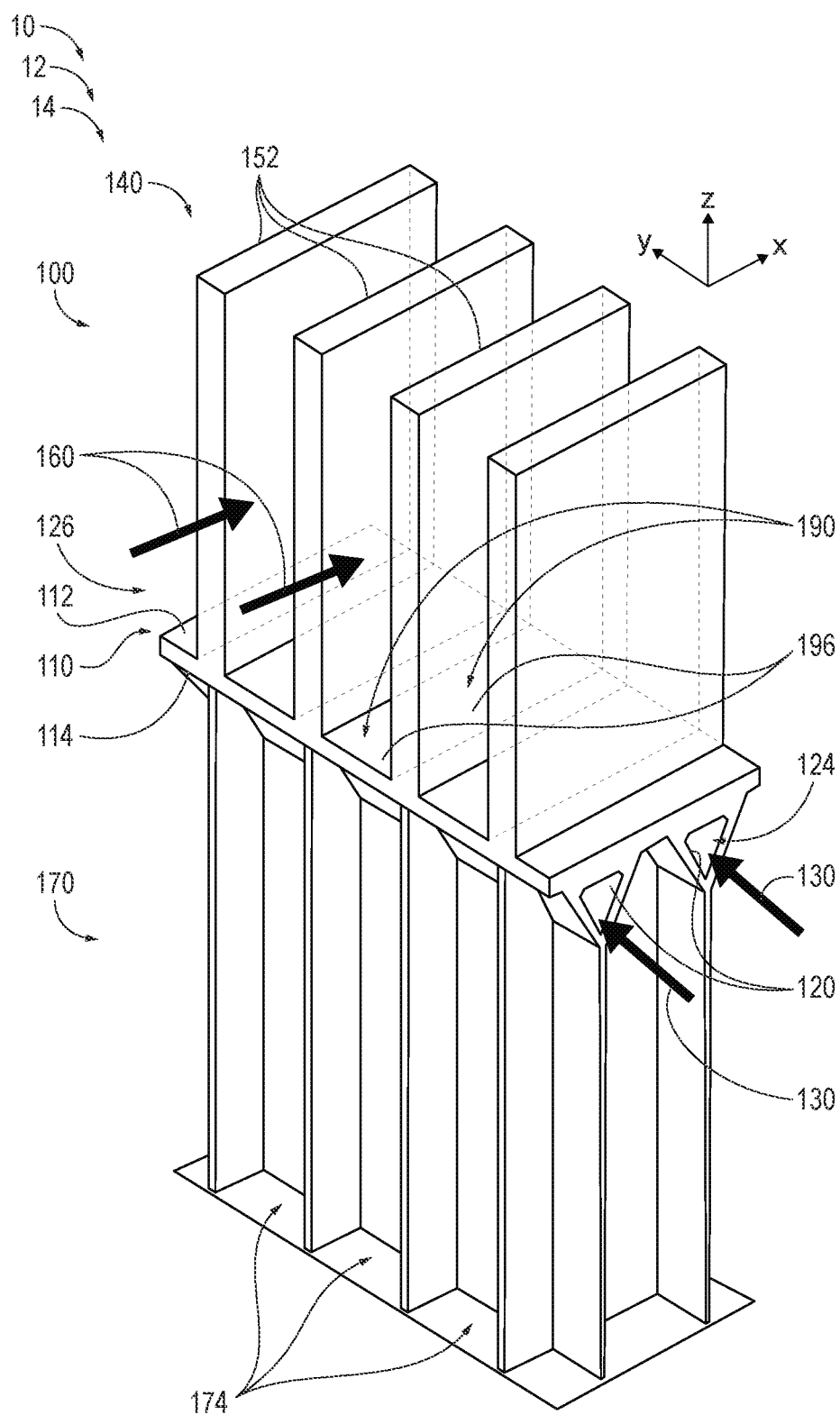
FIG. 5 is a less schematic illustration of an example of a sound-attenuating heat exchanger according to the present disclosure.

In some examples, and with reference to FIGS. 4-5, resonator cells 174 may have and/or define a rectangular, an at least partially rectangular, and/or an at least substantially rectangular transverse cross-sectional shape. In more specific examples, resonator cells 174 may have and/or define a square transverse cross-sectional shape a squircular transverse cross-sectional shape, and/or a hexagonal transverse cross-sectional shape.

In some examples, and with continued reference to FIGS. 4-5, elongate fluid conduits 120 may be straight, or at least substantially straight, and/or may extend along a linear, or at least substantially linear, fluid conduit trajectory. In some examples, elongate fluid conduits 120 may extend between adjacent pairs of resonator cells 174. In some such examples, elongate fluid conduits 120 may define, or at least partially define, at least one wall and/or boundary of at least a subset of the plurality of resonator cells 174.

Figure 3:
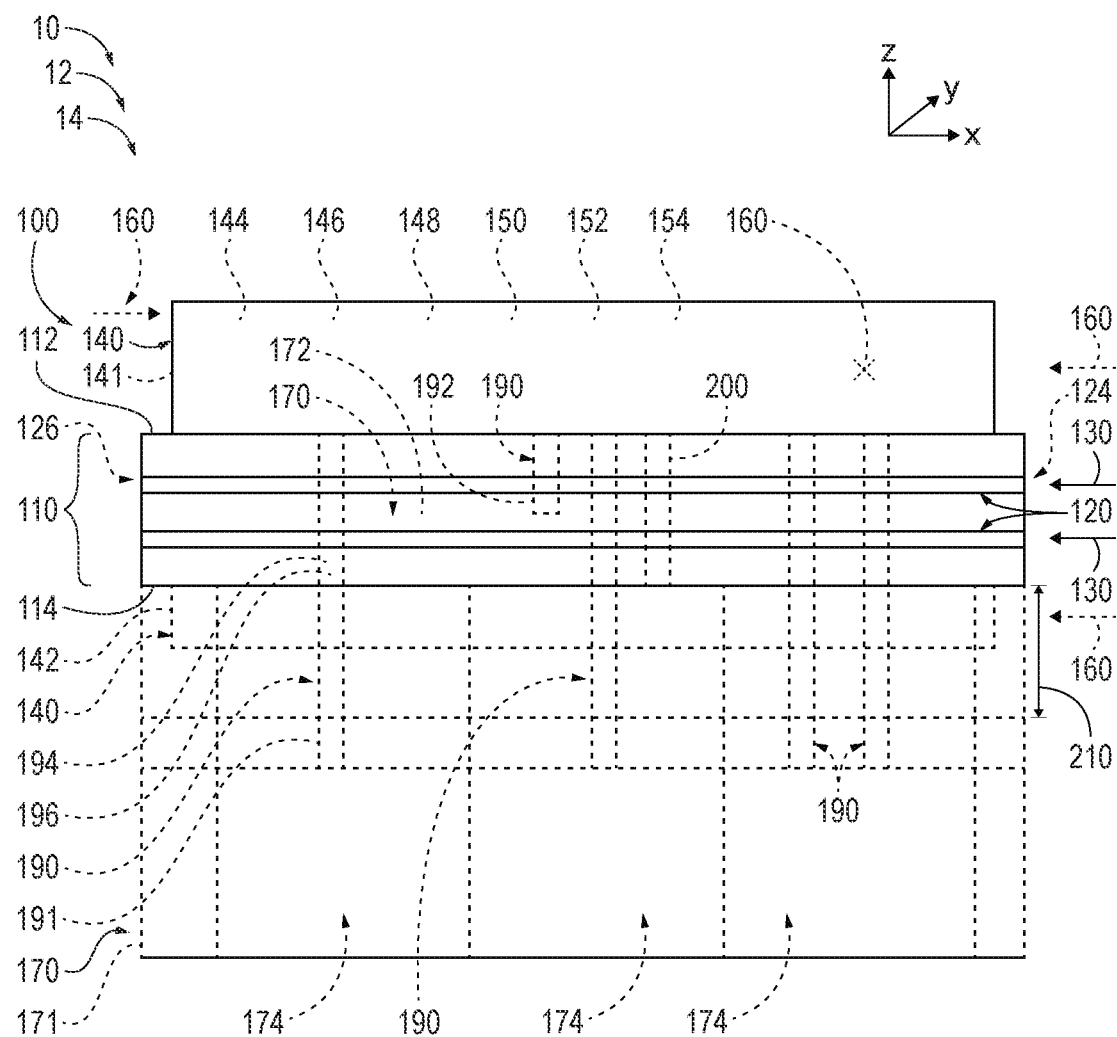
FIG. 3 is a schematic illustration of examples of sound-attenuating heat exchangers according to the present disclosure.

Turning to the specific example of sound-attenuating heat exchangers 100 that is illustrated in FIG. 4, and with general reference to FIGS. 3-4, resonator cell openings 190 may include a plurality of holes 194, which also may be referred to herein as cylindrical holes 194. In some such examples, each hole 194 may extend into a corresponding, or only one corresponding, resonator cell 174. However, and as discussed in more detail herein, multiple holes 194 may extend into the corresponding resonator cell 174. In some such examples, each hole 194 may extend between a corresponding adjacent pair of elongate fluid conduits 120.

Turning to the specific example of sound-attenuating heat exchangers 100 that is illustrated in FIG. 5, and with general reference to FIGS. 3 and 5, resonator cell openings 190 may be defined by a porous region 196 of and/or within base region 110. Porous region 196, when present, may include pores that extend between first base side 112 and second base side 114, such as to permit and/or facilitate fluid communication with resonator cells 174 therethrough. Similar to holes 194, porous region 196 may extend and/or may be defined between a corresponding adjacent pair of elongate fluid conduits 120.

Figure 6:
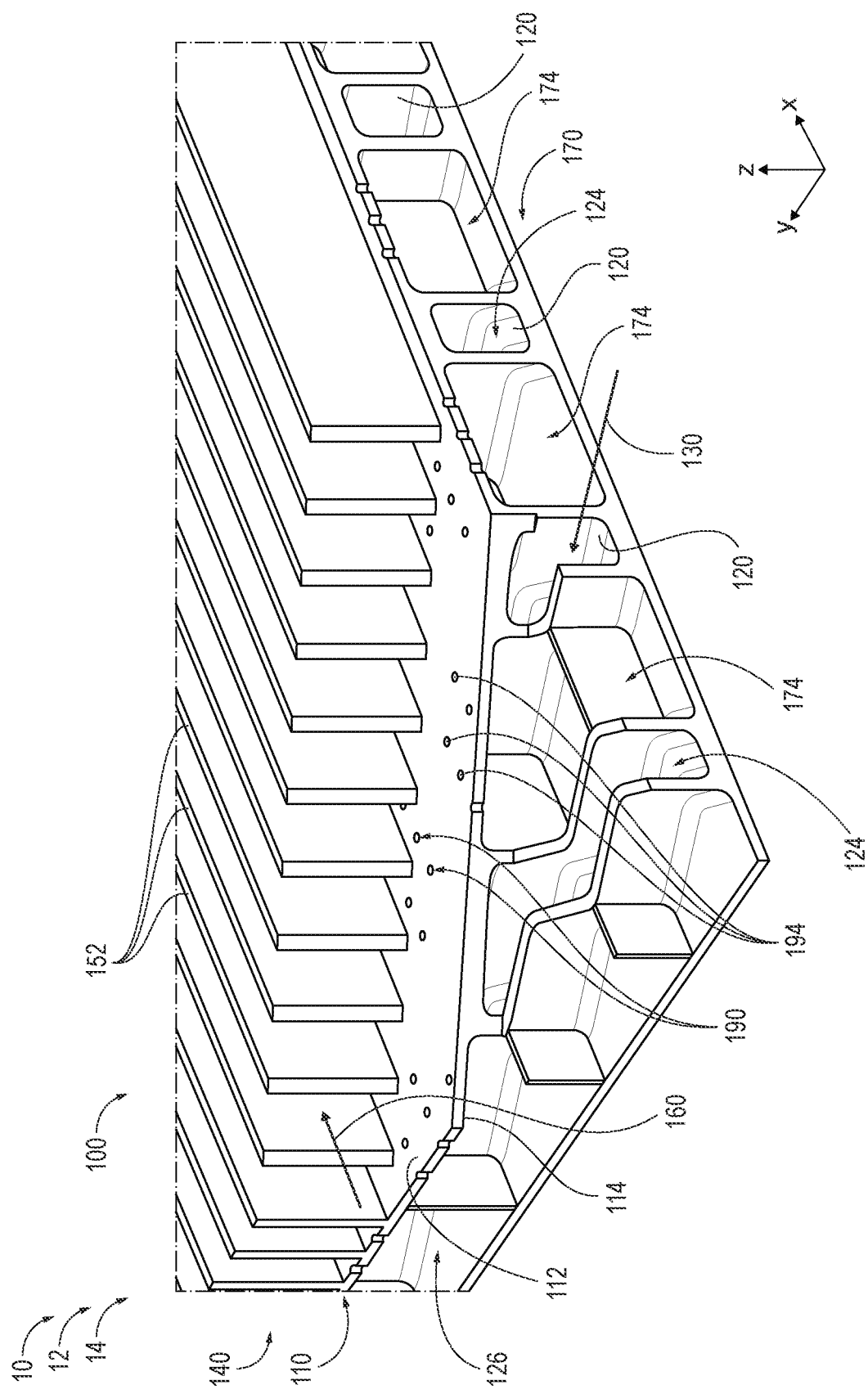
FIG. 6 is a less schematic illustration of an example of a sound-attenuating heat exchanger according to the present disclosure.
Figure 7:
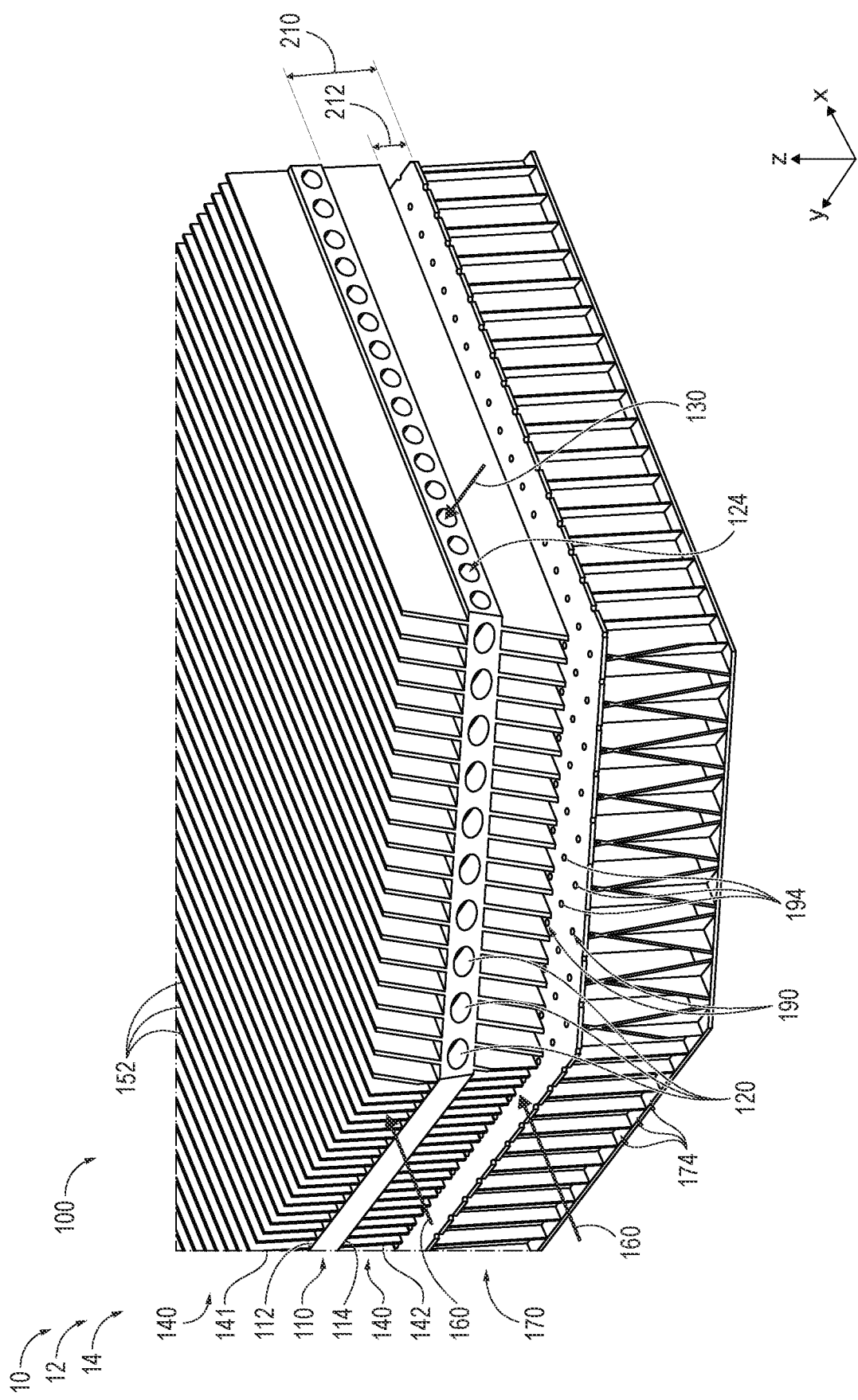
FIG. 7 is a less schematic illustration of an example of a sound-attenuating heat exchanger according to the present disclosure.

In some examples, and with reference to FIG. 6, resonator cells 174 may be arranged in-between corresponding elongate fluid conduits 120. Stated differently, resonator cells 174 and elongate fluid conduits 120 may be interleaved, or at least partially interleaved. Additionally or alternatively, elongate fluid conduits 120 may extend the entire or partial thickness the sound attenuating region 170 and/or a depth of elongate fluid conduits 120 may be equal, or at least substantially equal, to a depth of resonator cells 174. Each resonator cell 174 may have and/or define any suitable shape, examples of which include a polygonal transverse cross-sectional shape, a square transverse cross-sectional shape, a rectangular transverse cross-sectional shape, a hexagonal transverse cross-sectional shape, a circular transverse cross-sectional shape, a squircular transverse cross-sectional shape, and/or elliptical transverse cross-sectional shape. Such a configuration may provide resonator cells 174 with more shared surface area with first base side 112, which may permit more holes 194 to be utilized without interfering with elongate fluid conduits 120.

In some such examples, elongate fluid conduits 120 may extend along a nonlinear, or zig-zag, fluid conduit trajectory. Such a configuration may provide improved heat transfer between cooled fluid stream 130 and sound-attenuating heat exchanger 100. However, such a configuration also may increase a pressure drop of cooled fluid stream 130 across sound-attenuating heat exchanger 100. To mitigate the pressure drop of cooled fluid stream 130, alternative resonator cell 174 shapes may be used, such as square, rectangular, or circular to minimize or eliminate nonlinear elongate fluid conduits' 120 path.

In some examples of sound-attenuating heat exchangers 100, according to the present disclosure, and with reference to FIGS. 3 and 7-9, sound-attenuating region 170 may be spaced-apart from second base side 114 of base region 110 such that sound-attenuating heat exchangers 100 define a cooling fluid gap 210 between second base side 114 and sound-attenuating region 170. Cooling fluid gap 210 may be configured to receive a portion of cooling fluid stream 160. Such a configuration may increase a contact area between cooling fluid stream 160 and sound-attenuating heat exchangers 100, which may improve heat transfer between cooling fluid stream 160 and sound-attenuating heat exchangers 100 and/or may improve sound attenuation in cooling fluid stream 160 by sound-attenuating heat exchangers 100.

In some examples, and with continued reference to FIGS. 3 and 7-9, heat transfer-enhancing structures 140 may include a first plurality of heat transfer-enhancing structures 141 and a second plurality of heat transfer-enhancing structures 142. First plurality of heat transfer-enhancing structures 141 may extend from first base side 112 of base region 110. Second plurality of heat transfer-enhancing structures 142 may extend from second base side 114 of base region 110. Second plurality of heat transfer-enhancing structures 142 may span a portion of cooling fluid gap 210 or may span the entirety of cooling fluid gap 210. When second plurality of heat transfer-enhancing structures 142 spans the portion of cooling fluid gap 210, a physical gap 212 may exist between the second plurality of heat transfer-enhancing structures and sound-attenuating region 170.

Both first plurality of heat transfer-enhancing structures 141 and second plurality of heat transfer-enhancing structures 142 may be configured to exchange thermal energy with cooling fluid stream 130; and the inclusion of both first plurality of heat transfer-enhancing structures 141 and second plurality of heat transfer-enhancing structures 142, within sound-attenuating heat exchangers 100, may increase a surface area for, or an efficiency of, heat transfer between sound-attenuating heat exchangers 100 and cooling fluid stream 160.

Figure 8:
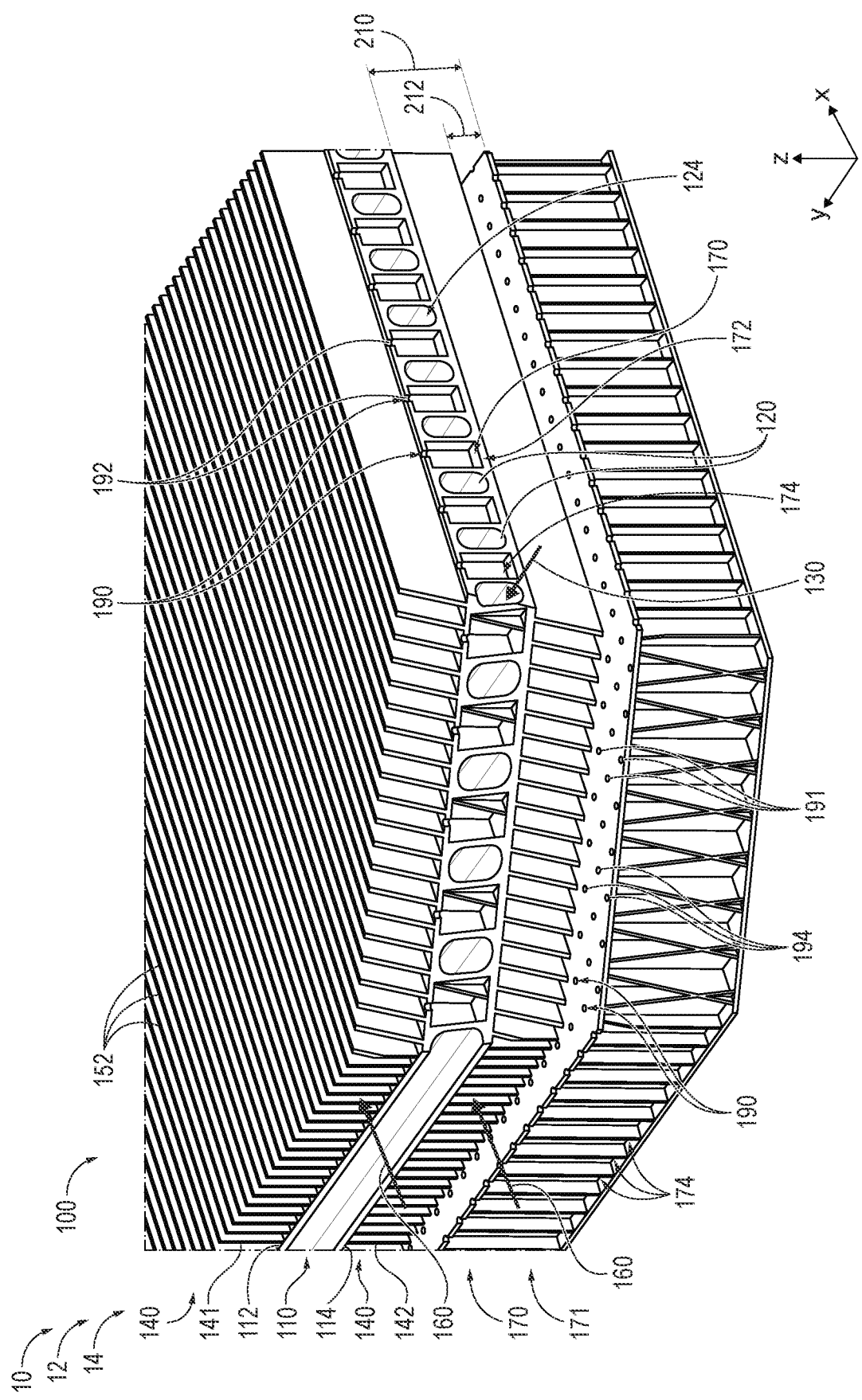
FIG. 8 is a less schematic illustration of an example of a sound-attenuating heat exchanger according to the present disclosure.

In some examples, and as illustrated in FIGS. 3 and 8, sound-attenuating region 170 may include a first sound-attenuating region 171 and a second sound-attenuating region 172. In such examples, first sound-attenuating region 171 may be positioned on second base side 114 of base region 110, and second sound-attenuating region 172 may extend and/or may be defined within base region 110.

In such examples, resonator cell openings 190 may include a first plurality of resonator cell openings 191 and a second plurality of resonator cell openings 192. First plurality of resonator cell openings 191 may open from resonator cells 174 of first sound-attenuating region 171 and/or toward heat transfer-enhancing structures 140, and second plurality of resonator cell openings 192 may extend from first base side 112 and/or into resonator cells 174 of second sound-attenuating region 172. Such a configuration may increase a surface area and/or volume of sound-attenuating region 170, which may improve sound attenuation within cooling fluid stream 160.

Figure 9:
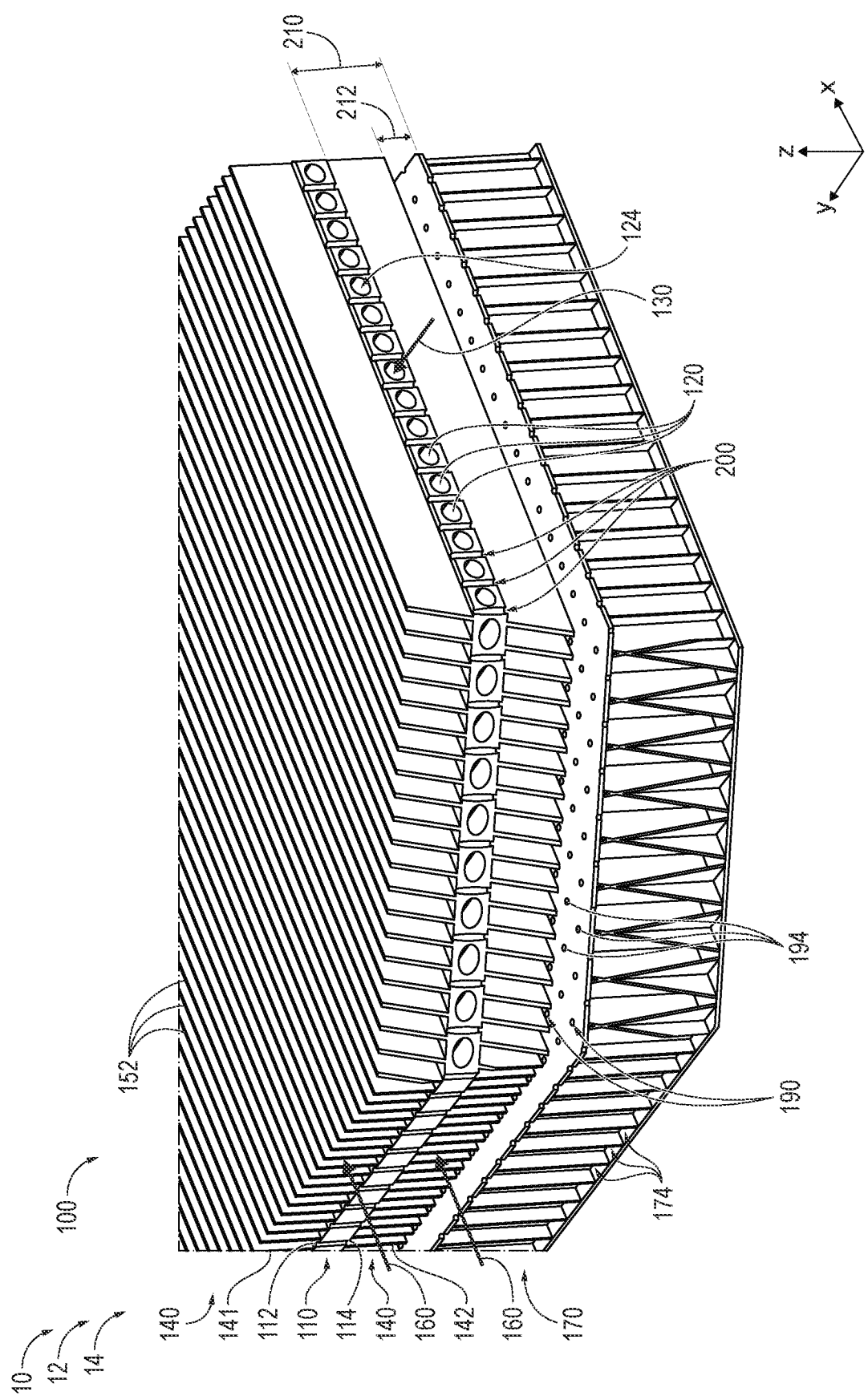
FIG. 9 is a less schematic illustration of an example of a sound-attenuating heat exchanger according to the present disclosure.

In some examples, and as illustrated in FIGS. 3 and 9, sound-attenuating heat exchangers 100 may include a plurality of pass-through openings 200. Pass-through openings 200 may be defined within base region 110 and/or may extend between first base side 112 and second base side 114. Such a configuration may provide improved acoustic communication between cooling fluid stream 160 and sound-attenuating region 170, thereby improving attenuation of sound by sound-attenuating heat exchangers 100.

It is within the scope of the present disclosure that sound-attenuating heat exchangers 100 may include and/or may be defined by any suitable structure and/or structures. In some examples, sound-attenuating heat exchangers 100 may include and/or be monolithic sound-attenuating heat exchangers 100 and/or unitary sound-attenuating heat exchangers 100. In some examples, sound-attenuating heat exchangers 100 may include and/or be additively manufactured sound-attenuating heat exchangers.

Base region 110 may include any suitable structure that may define first base side 112 and second base side 114 and/or from which heat transfer-enhancing structures 140 may extend. In some examples, base region 110 may include and/or be a thin and/or a sheet-like base region 110.

Resonator cell openings 190 may include and/or be any suitable structure and/or opening that may provide fluid communication between resonator cells 174 and cooling fluid stream 160, that may extend from corresponding resonator cells 174, and/or that may open toward heat transfer-enhancing structures 140. Examples of resonator cell openings 190 include a plurality of machined resonator cell openings, a plurality of subtractively manufactured resonator cell openings, a plurality of additively manufactured resonator cell openings, a plurality of drilled holes, a plurality of metal powder furnace sintered resonator cell openings, and/or a plurality of laser drilled holes. In some examples, and as discussed, resonator cell openings 190 are defined by porous region 196. In some examples, porous region 196 may be defined by and/or within base region 110. In some examples, porous region 196 may be spaced-apart from base region 110. In some examples, porous region 196 may define a plurality of holes that provide a tortuous flow path.

In some examples, resonator cell openings 190 may define an open area upon a surface, such as first base side 112, through which the resonator cell openings extend. Examples of the open area include open areas of at least 2%, at least 2.5%, at least 3%, at least 3.5%, at least 4%, at least 4.5%, at least 5%, at least 8%, at most 7.5%, at most 7%, at most 6.5%, at most 6%, at most 5.5%, at most 5%, at most 4.5%, at most 4%, at most 3.5%, and/or at most 3%.

In some examples, resonator cell openings 190 may have and/or define an opening diameter, or an effective opening diameter. Examples of the opening diameter include diameters of at least 0.4 millimeters (mm), at least 0.5 mm, at least 0.6 mm, at least 0.7 mm, at least 0.8 mm, at least 0.9 mm, at least 1 mm, at least 1.1 mm, at least 1.2 mm, at least 1.3 mm, at least 1.4 mm, at least 1.5 mm, at most 2 mm, at most 1.9 mm, at most 1.8 mm, at most 1.7 mm, at most 1.6 mm, at most 1.5 mm, at most 1.4 mm, at most 1.3 mm, at most 1.2 mm, and/or at most 1.1 mm.

Resonator cell openings 190 may be spaced-apart and/or distinct from elongate fluid conduits 120. Stated differently, resonator cell openings 190 may be fluidly isolated from elongate fluid conduits 120. Stated still differently, sound-attenuating heat exchangers 100 may be configured to permit fluid communication between cooling fluid stream 160 and resonator cells 174 and also may be configured to maintain fluid separation between cooling fluid stream 160 and cooled fluid stream 130.

In some examples, resonator cell openings 190 may be defined within base region 110, may extend through base region 110, and/or may extend between first base side 112 and second base side 114. In some examples, resonator cell openings 190 may be separate, distinct, and/or spaced-apart from base region 110.

In some examples, resonator cell openings 190 may extend perpendicular, or at least substantially perpendicular, to a longitudinal axis of elongate fluid conduits 120. Additionally or alternatively, resonator cell openings may extend perpendicular, or at least substantially perpendicular, to first base side 112.

Elongate fluid conduits 120 may include and/or be any suitable structure that may be at least partially defined by base region 110, that may be configured to contain cooled fluid stream 130, and/or that may be configured to maintain fluid separation between cooled fluid stream 130 and cooling fluid stream 160. An example of elongate fluid conduits 120 includes a plurality of tubular elongate fluid conduits.

In some examples, each elongate fluid conduit 120 may extend between a corresponding conduit entrance 124 and a corresponding conduit exit 126. Conduit entrance 124 may be configured to receive a corresponding fraction of cooled fluid stream 130, and conduit exit 126 may be configured to discharge the corresponding fraction of the cooled fluid stream.

Heat transfer-enhancing structures 140 may include and/or be any suitable structure that may be adapted, configured, designed, and/or constructed to promote and/or to enhance heat transfer with cooling fluid stream 160 and/or between sound-attenuating heat exchangers 100 and cooling fluid stream 160. As an example, and as illustrated in FIGS. 3-9, heat transfer-enhancing structures 140 may include and/or be a plurality of fins 152, which may extend and/or project from base region 110. Fins 152, when present, may be continuous, discontinuous, and/or segmented along a length thereof. Additional examples of heat transfer-enhancing structures 140 include a plurality of projections 144, a plurality of pins 146, a plurality of posts 148, a plurality of sheet-like projections 150, and/or a plurality of dimples 154, as indicated in FIG. 3. Dimples 154, when present, may be concave or convex dimples 154.

When heat transfer-enhancing structures 140 includes the plurality of fins 152, each fin of the plurality of fins may extend along a corresponding fin axis, which may be parallel, or at least substantially parallel, to a cooling fluid stream direction of cooling fluid stream 160. Additionally or alternatively, the corresponding fin axis may be perpendicular, or at least substantially perpendicular, to the longitudinal axis of elongate fluid conduits 120.

Sound-attenuating region 170 may include any suitable structure that includes resonator cells 174 and/or resonator cell openings 190. In some examples, an interior volume of each resonator cell 174 may be in fluid communication with cooling fluid stream 160 via, or only via, a corresponding resonator cell opening 190 and/or via a corresponding subset of the plurality of resonator cell openings 190.

Resonator cells 174 may have and/or define any suitable structure. As an example, each resonator cell 174 may define a corresponding Helmholtz resonator for sound waves that propagate within cooling fluid stream 160. As another example, each resonator cell 174 may define a corresponding quarter-wavelength resonator for the sound waves. As yet another example, each resonator cell 174 may function at least partially as both a Helmholtz resonator and a quarter-wavelength resonator for the sound waves.

In some examples, sound-attenuating region 170 may extend at least partially, or even completely, from second base side 114. In some examples, sound-attenuating region 170 may extend at least partially, or even completely, from elongate fluid conduits 120. In some examples, sound-attenuating region 170 may be spaced apart and/or distinct from base region 110 and/or from second base side 114.

FIG. 10 is a flowchart depicting examples of methods 300 of exchanging heat and attenuating sound with a sound-attenuating heat exchanger, such as sound-attenuating heat exchangers 100, according to the present disclosure. Methods 300 include flowing a cooling fluid stream at 310, receiving a sound wave at 320, and attenuating the sound wave at 330. Methods 300 also include receiving a cooled fluid stream at 340, exchanging thermal energy at 350, and maintaining fluid separation at 360. Methods 300 also may include flowing the cooled fluid stream in a closed loop at 370.

Flowing the cooling fluid stream at 310 may include flowing the cooling fluid stream through a plurality of heat transfer-enhancing structures that extends from a first base side of a base region of the sound-attenuating heat exchanger. Examples of the plurality of heat transfer-enhancing structures are disclosed herein with reference to heat transfer-enhancing structures 140. Examples of the base region are disclosed herein with reference to base region 110. Examples of the first base side are disclosed herein with reference to first base side 112.

The flowing at 310 may be accomplished in any suitable manner. As an example, the flowing at 310 may include flowing a compressed air stream from a system, such as from a fan of a jet engine of an aircraft. Examples of the fan, the jet engine, and the aircraft are disclosed herein with reference to fan 22, jet engine 14, and aircraft 12.

The flowing at 310 may be performed with any suitable timing and/or sequence during methods 300. As examples, the flowing at 310 may be performed at least partially concurrently with the receiving at 320, the attenuating at 330, the receiving at 340, the exchanging at 350, the maintaining at 360, and/or the flowing at 370.

Receiving the sound wave at 320 may include receiving the sound wave into a plurality of resonator cells of a sound-attenuating region of the sound-attenuating heat exchanger. This may include receiving the sound wave via a plurality of resonator cell openings of the sound-attenuating heat exchanger. The sound wave may propagate within the cooling fluid stream. The sound-attenuating region may be positioned on a second base side of the base region, which may be opposed to the first base side of the base region; and each resonator cell opening of the plurality of resonator cell openings may open from a corresponding resonator cell and toward the plurality of heat transfer-enhancing structures.

Examples of the plurality of resonator cells are disclosed herein with reference to resonator cells 174. Examples of the sound-attenuating region are disclosed herein with reference to sound-attenuating region 170.

The receiving at 320 may be performed with any suitable timing and/or sequence during methods 300. As examples, the receiving at 320 may be performed at least partially concurrently with the flowing at 310, the attenuating at 330, the receiving at 340, the exchanging at 350, the maintaining at 360, and/or the flowing at 370. As another example, the receiving at 320 may be at least partially responsive to and/or a result of the flowing at 310.

Attenuating the sound wave at 330 may include attenuating the sound wave with, via, within, and/or utilizing the sound-attenuating region. The attenuating at 330 may be concurrent with, based upon, and/or a result of the flowing at 310 and/or the receiving at 320.

Receiving the cooled fluid stream at 340 may include receiving the cooled fluid stream with and/or within a plurality of elongate fluid conduits, which may be at least partially defined within the base region. Examples of the plurality of elongate fluid conduits are disclosed herein with reference to elongate fluid conduits 120. Examples of the cooled fluid stream are disclosed herein with reference to cooled fluid stream 130.

The receiving at 340 may be performed in any suitable manner. As an example, the receiving at 340 may include receiving the cooled fluid stream from a cooled component of the system, such as from the jet engine of the aircraft. Examples of the cooled component are disclosed herein with reference to cooled component 24.

The receiving at 340 may be performed with any suitable timing and/or sequence during methods 300. As examples, the receiving at 340 may be performed at least partially concurrently with the flowing at 310, the receiving at 320, the attenuating at 330, the exchanging at 350, the maintaining at 360, and/or the flowing at 370.

Exchanging thermal energy at 350 may include exchanging thermal energy between the cooling fluid stream and the cooled fluid stream within the sound-attenuating heat exchanger. This may include transferring thermal energy, or heat, from the cooled fluid stream to the cooling fluid stream via, or via thermal conduction within, the sound-attenuating heat exchanger and/or transferring thermal energy from the cooling fluid stream to the cooled fluid stream via, or via thermal conduction within, the sound-attenuating heat exchanger.

The exchanging at 350 may be performed with any suitable timing and/or sequence during methods 300. As examples, the exchanging at 350 may be performed at least partially concurrently with the flowing at 310, the receiving at 320, the attenuating at 330, the receiving at 340, the maintaining at 360, and/or the flowing at 370.

Maintaining fluid separation at 360 may include maintaining fluid separation between the cooling fluid stream and the cooled fluid stream. This may include maintaining the fluid separation within the sound-attenuating heat exchanger. Stated differently, the sound-attenuating heat exchanger may be configured to perform the attenuating at 330 and the exchanging at 350 without mixing and/or otherwise combining the cooled fluid stream and the cooling fluid stream.

The maintaining at 360 may be performed with any suitable timing and/or sequence during methods 300. As examples, the maintaining at 360 may be performed at least partially concurrently with the flowing at 310, the receiving at 320, the attenuating at 330, the receiving at 340, the exchanging at 350, and/or the flowing at 370.

Flowing the cooled fluid stream in a closed loop at 370 may include flowing the cooled fluid stream in the closed loop within the system, such as the aircraft and/or the jet engine of the aircraft. This may include flowing within the closed loop to cool the cooled component of the system. Stated another way, the cooled fluid stream may be contained and/or retained within the system, and the flowing at 370 may include circulating the cooled fluid stream within the system, such as to cool the cooled component with, via, and/or utilizing the cooled fluid stream.

The flowing at 370 may be performed with any suitable timing and/or sequence during methods 300. As examples, the flowing at 370 may be performed at least partially concurrently with the flowing at 310, the receiving at 320, the attenuating at 330, the receiving at 340, the exchanging at 350, and/or the maintaining at 360.

Illustrative, non-exclusive examples of inventive subject matter according to the present disclosure are described in the following enumerated paragraphs:

A1. A sound-attenuating heat exchanger (100), comprising:
  a base region (110) that defines a first base side (112) and an opposed second base side (114);
  a plurality of elongate fluid conduits (120) at least partially defined by the base region (110) and configured to contain a cooled fluid stream (130);
  a plurality of heat transfer-enhancing structures (140) extending from the first base side (112) and configured to exchange thermal energy with a cooling fluid stream (160); and
  a sound-attenuating region (170) extending from the second base side (114), wherein the sound-attenuating region includes (140):
  (i) a plurality of resonator cells (174) configured to attenuate sound; and
  (ii) a plurality of resonator cell openings (190), wherein each resonator cell opening (190) of the plurality of resonator cell openings (190) opens from a corresponding resonator cell (174) toward the plurality of heat transfer-enhancing structures (140).

A2. The sound-attenuating heat exchanger (100) of paragraph A1, wherein the plurality of heat transfer-enhancing structures (140) includes a plurality of fins (152), and further wherein each resonator cell opening (190) of the plurality of resonator cell openings (190) is defined within the base region (110) and extends between the first base side (112) and the second base side (114).

A3. The sound-attenuating heat exchanger (100) of paragraph A2, wherein each resonator cell (174) of the plurality of resonator cells (174) defines at least one of:
  (i) a square transverse cross-sectional shape;
  (ii) a squircular transverse cross-sectional shape;
  (iii) a rectangular transverse cross-sectional shape, and
  (iv) a hexagonal transverse cross-sectional shape.

A4. The sound-attenuating heat exchanger (100) of any of paragraphs A2-A3, wherein each elongate fluid conduit (120) of the plurality of elongate fluid conduits (120 at least one of:
  (i) extends along a linear, or at least substantially linear, fluid conduit trajectory; and
  (ii) extends at least partially between adjacent pairs of resonator cells (174) of the plurality of resonator cells (174); and
  (iii) at least partially defines at least one wall of at least one resonator cell (174) of the plurality of resonator cells (174).

A5. The sound-attenuating heat exchanger (100) of any of paragraphs A2-A4, wherein the plurality of resonator cell openings (190) includes, or is, a plurality of holes (194), or cylindrical holes.

A6. The sound-attenuating heat exchanger (100) of paragraph A5, wherein each hole (194) of the plurality of holes (194) extends into a corresponding, or only one corresponding, resonator cell (174) of the plurality of resonator cells (174).

A7. The sound-attenuating heat exchanger (100) of any of paragraphs A5-A6, wherein each hole (194) of the plurality of holes (194) extends between a corresponding adjacent pair of elongate fluid conduits (120) of the plurality of elongate fluid conduits (120).

A8. The sound-attenuating heat exchanger (100) of any of paragraphs A2-A7, wherein the plurality of resonator cell openings (190) is defined by a porous region (196) of the base region (110).

A9. The sound-attenuating heat exchanger (100) of paragraph A8, wherein the porous region (196) extends between a corresponding adjacent pair of elongate fluid conduits (120) of the plurality of elongate fluid conduits (120).

A10. The sound-attenuating heat exchanger (100) of any of paragraphs A2-A9, wherein at least one of:
  (i) the plurality of resonator cells (174) and the plurality of elongate fluid conduits (120) are at least partially interleaved;
  (ii) the plurality of resonator cells (174) is arranged in-between corresponding elongate fluid conduits (120) of the plurality of elongate fluid conduits (120); and
  (iii) a depth of the plurality of elongate fluid conduits (120) is equal, or at least substantially equal, to a depth of the plurality of resonator cells (174).

A11. The sound-attenuating heat exchanger (100) of any of paragraphs A2-A10, wherein each resonator cell (174) of the plurality of resonator cells (174) defines at least one of:
  (i) a polygonal transverse cross-sectional shape;
  (ii) a hexagonal transverse cross-sectional shape;
  (iii) a square transverse cross-sectional shape;
  (iv) a rectangular transverse cross-sectional shape;
  (v) a circular transverse cross-sectional shape;
  (vi) a squircular transverse cross-sectional shape; and
  (viii) an elliptical transverse cross-section shape.

A12. The sound-attenuating heat exchanger (100) of any of paragraphs A2-A11, wherein each elongate fluid conduit (120) of the plurality of elongate fluid conduits (120) extends along at least one of:
  (i) a nonlinear fluid conduit trajectory, such as a zig-zag or serpentine; or
  (ii) a linear fluid conduit trajectory.

B1. A sound-attenuating heat exchanger (100), comprising:
  a base region (110) that defines a first base side (112) and an opposed second base side (114);
  a plurality of elongate fluid conduits (120) at least partially defined by the base region (110) and configured to contain a cooled fluid stream (130);
  a plurality of heat transfer-enhancing structures (140) extending from the first base side (112) and configured to exchange thermal energy with a cooling fluid stream (160); and
  a sound-attenuating region (170) positioned on the second base side (114) and spaced-apart from the second base side (114) such that the sound-attenuating heat exchanger (100) defines a cooling fluid gap (210), which is configured to receive a portion of the cooling fluid stream (160), between the second base side (114) and the sound-attenuating region (170), wherein the sound-attenuating region (170) includes:
  (i) a plurality of resonator cells (174) configured to attenuate sound; and
  (ii) a plurality of resonator cell openings (190), wherein each resonator cell opening (190) of the plurality of resonator cell openings (190) opens from a corresponding resonator cell (174) of the plurality of resonator cells (174) and toward the plurality of heat transfer-enhancing structures (140).

B2. The sound-attenuating heat exchanger (100) of paragraph B1, wherein the plurality of heat transfer-enhancing structures (140) is a first plurality of heat transfer-enhancing structures (141), and further wherein the sound-attenuating heat exchanger (100) includes a second plurality of heat transfer-enhancing structures (142) extending from the second base side (114) and configured to exchange thermal energy with the cooling fluid stream (160).

B3. The sound-attenuating heat exchanger (100) of paragraph B2, wherein the sound-attenuating region (170) is a first sound-attenuating region (171), and further wherein the sound-attenuating heat exchanger (100) includes a second sound-attenuation region (172), which is defined within the base region (110), wherein the plurality of resonator cell openings (190) is a first plurality of resonator cell openings (191), and further wherein the sound-attenuating heat exchanger (100) includes a second plurality of resonator cell openings (192), which extend from the first base side (112) and into the second sound-attenuating region (172).

B4. The sound-attenuating heat exchanger (100) of any of paragraphs B2-B3, wherein the sound-attenuating heat exchanger (100) includes a plurality of pass-through openings (200), which is defined within the base region (110) such that each pass-through opening (200) of the plurality of pass-through openings (200) extends between the first base side (112) and the second base side (114).

C1. The sound-attenuating heat exchanger (100) of any of paragraphs A1-B5, wherein each resonator cell opening (190) of the plurality of resonator cell openings (190) provides fluid communication between the corresponding resonator cell (174) and the cooling fluid stream (160) to attenuate sound within the cooling fluid stream (160).

C2. The sound-attenuating heat exchanger (100) of any of paragraphs A1-C1, wherein the sound-attenuating heat exchanger (100) is at least one of:
  (i) a monolithic sound-attenuating heat exchanger;
  (ii) a unitary sound-attenuating heat exchanger; and
  (iii) an additively manufactured sound-attenuating heat exchanger.

C3. The sound-attenuating heat exchanger (100) of any of paragraphs A1-C2, wherein the plurality of resonator cell openings (190) is defined within the base region (110).

C3. The sound-attenuating heat exchanger (100) of any of paragraphs A1-A2, wherein each resonator cell opening (190) of the plurality of resonator cell openings (190) at least one of:
  (i) extends through the base region (110); and
  (ii) extends between the first base side (112) and the second base side (114).

C4. The sound-attenuating heat exchanger (100) of any of paragraphs A1-C3, wherein the plurality of resonator cell openings (190) extends at least one of:
  (i) perpendicular, or at least substantially perpendicular, to a longitudinal axis of the plurality of elongate fluid conduits (120); and
  (ii) perpendicular to the first base side (112).

C5. The sound-attenuating heat exchanger (100) of any of paragraphs A1-C4, wherein the plurality of elongate fluid conduits (120) includes a plurality of tubular elongate fluid conduits.

C6. The sound-attenuating heat exchanger (100) of any of paragraphs A1-C5, wherein each elongate fluid conduit (120) of the plurality of elongate fluid conduits (120) extends between a corresponding conduit entrance (124), which is configured to receive a corresponding fraction of the cooled fluid stream (130), and a corresponding conduit exit (126), which is configured to discharge the corresponding fraction of the cooled fluid stream (130).

C7. The sound-attenuating heat exchanger (100) of any of paragraphs A1-C6, wherein the plurality of heat transfer-enhancing structures (140) includes at least one of:
  (i) a plurality of projections (144);
  (ii) a plurality of pins (146);
  (iii) a plurality of posts (148);
  (iv) a plurality of sheet-like projections (150);
  (v) a/the plurality of fins (152); and
  (vi) a plurality of dimples (154).

C8. The sound-attenuating heat exchanger (100) of any of paragraphs A1-C7, wherein the plurality of heat transfer-enhancing structures (140) includes a/the plurality of fins (152), and further wherein each fin (152) of the plurality of fins (152) extends along a corresponding fin axis that is parallel, or at least substantially parallel, to a cooling fluid stream direction of the cooling fluid stream (160).

C9. The sound-attenuating heat exchanger (100) of any of paragraphs A1-C8, wherein an interior volume of each resonator cell (174) of the plurality of resonator cells (174) is in fluid communication with the cooling fluid stream (160) only via a corresponding resonator cell opening (190) of the plurality of resonator cell openings (190).

C10. The sound-attenuating heat exchanger (100) of any of paragraphs A1-C9, wherein each resonator cell (174) of the plurality of resonator cells (174) defines at least one of:
  (i) a corresponding Helmholtz resonator for sound waves within the cooling fluid stream (160); and
  (ii) a corresponding quarter-wavelength resonator for sound waves within the cooling fluid stream (160).

C11. The sound-attenuating heat exchanger (100) of any of paragraphs A1-C10, wherein the sound-attenuating region (170) extends at least partially, or even completely, from the second base side (114).

C12. The sound-attenuating heat exchanger (100) of any of paragraphs A1-C11, wherein the sound-attenuating region (170) extends at least partially, or even completely, from the plurality of elongate fluid conduits (120).

C13. The sound-attenuating heat exchanger (100) of any of paragraphs A1-C12, wherein the sound-attenuating region (170) is spaced-apart from the second base side (114).

C14. The sound-attenuating heat exchanger (100) of any of paragraphs A1-C13, wherein the plurality of resonator cell openings (190) includes at least one of:
  (i) a plurality of machined resonator cell openings;
  (ii) a plurality of subtractively manufactured resonator cell openings;
  (iii) a plurality of additively manufactured resonator cell openings;
  (iv) a plurality of drilled holes;
  (v) a plurality of metal powder furnace sintered resonator cell openings; and
  (vi) a plurality of laser drilled holes.

C15. The sound-attenuating heat exchanger (100) of any of paragraphs A1-C14, wherein the plurality of resonator cell openings (190) is defined by a porous region (196), optionally wherein one of:
  (i) the porous region (196) is defined by the base region (110); and
  (ii) the porous region (196) is spaced-apart from the base region (110).

C16. The sound-attenuating heat exchanger (100) of any of paragraphs A1-C15, wherein each resonator cell opening (190) of the plurality of resonator cell openings (190) is at least one of:
  (i) spaced-apart from the plurality of elongate fluid conduits (120); and
  (ii) fluidly isolated from the plurality of elongate fluid conduits (120).

C16.1 The sound-attenuating heat exchanger (100) of any of paragraphs A1-C16, wherein at least two resonator cell openings (190) of the plurality of resonator cell openings (190) opens from the corresponding resonator cell (174) toward the plurality of heat transfer-enhancing structures (140).

C17. A jet engine installation (14), comprising:
  a fan (22);
  a fan housing;
  a turbine assembly (28) mechanically coupled to, and configured to rotate with, the fan (22);
  a turbine housing (30) at least partially surrounding the turbine assembly (28);
  a nacelle (26) at least partially surrounding the fan (22), the turbine assembly (28), and the turbine housing (30); and
  the sound-attenuating heat exchanger (100) of any of paragraphs A1-A33.

C18. The jet engine installation (14) of paragraph C17, wherein the jet engine installation (14) is free of an aerodynamically shaped layer that extends between the plurality of heat transfer-enhancing structures (140) and the turbine assembly (28).

C19. The jet engine installation (14) of any of paragraphs C17-C18, wherein the plurality of heat transfer-enhancing structures (140) is positioned between the plurality of resonator cell openings (190) and the turbine assembly (28).

C20. An aircraft (12) including the jet engine installation (14) of any of paragraphs C17-C19.

C21. The aircraft (12) of paragraph C20, wherein the sound-attenuating heat exchanger (100) forms a portion of a heat transfer system (32), and further wherein the cooling fluid stream (160) flows within a closed loop within the heat transfer system (32).

D1. A method (500) of exchanging heat and attenuating sound within a sound-attenuating heat exchanger, the method comprising:
  flowing (310) a cooling fluid stream through a plurality of heat transfer-enhancing structures that extends from a first base side of a base region of the sound-attenuating heat exchanger;
  receiving (320), into a plurality of resonator cells of a sound-attenuating region of the sound-attenuating heat exchanger and via a plurality of resonator cell openings of the sound-attenuating heat exchanger, a sound wave that propagates within the cooling fluid stream, wherein the sound-attenuating region is positioned on a second base side of the base region, which is opposed to the first base side of the base region, and further wherein each resonator cell opening of the plurality of resonator cell openings opens from a corresponding resonator cell of the plurality of resonator cells and toward the plurality of heat transfer-enhancing structures;
  attenuating (330) the sound wave within the sound-attenuating region;
  receiving (340), with a plurality of elongate fluid conduits that is at least partially defined within the base region, a cooled fluid stream;
  exchanging (350) thermal energy between the cooling fluid stream and the cooled fluid stream within the sound-attenuating heat exchanger; and
  maintaining (360) fluid separation between the cooling fluid stream and the cooled fluid stream within the sound-attenuating heat exchanger.

D2. The method (500) of paragraph D1, wherein the sound-attenuating heat exchanger includes any suitable structure, function, and/or feature of any of the sound-attenuating heat exchangers of any of paragraphs A1-C16.

D3. The method (500) of any of paragraphs D1-D2, wherein the flowing (310) the cooling fluid stream includes flowing a compressed air stream from a fan of a jet engine of an aircraft.

D4. The method (500) of any of paragraphs D1-D3, wherein the receiving (340) the cooled fluid stream includes receiving the cooled fluid stream from a cooled component of a/the jet engine of an/the aircraft.

D5. The method (500) of paragraph D4, wherein the method (500) further includes flowing (370) the cooled fluid stream in a closed loop within the aircraft.

D6. The method (500) of any of paragraphs D3-D5, wherein the jet engine includes any suitable structure, function, and/or feature of any of the jet engine installations of any of paragraphs C17-C19.

D7. The method (500) of any of paragraphs B3-B6, wherein the aircraft includes any suitable structure, function, and/or feature of any of the aircraft of any of paragraphs C20-C21.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" may mean A alone, B alone, C alone, A and B together, A and C together, B and C together, A, B, and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/ or methods, are also within the scope of the present disclosure.

As used herein, "at least substantially," when modifying a degree or relationship, may include not only the recited "substantial" degree or relationship, but also the full extent of the recited degree or relationship. A substantial amount of a recited degree or relationship may include at least 75% of the recited degree or relationship. For example, an object that is at least substantially formed from a material includes objects for which at least 75% of the objects are formed from the material and also includes objects that are completely formed from the material. As another example, a first length that is at least substantially as long as a second length includes first lengths that are within 75% of the second length and also includes first lengths that are as long as the second length.

The invention claimed is:

1. A sound-attenuating heat exchanger, comprising:
    a base region that defines a first base side and an opposed second base side, wherein the first base side and the second base side face away from one another;
    a plurality of elongate fluid conduits at least partially bounded by a planar region of the second base side that faces away from the first base side, wherein the plurality of elongate fluid conduits is configured to contain a cooled fluid stream;
    a plurality of heat transfer-enhancing structures extending from the first base side and configured to exchange thermal energy with a cooling fluid stream; and
    a sound-attenuating region extending from the second base side, wherein the sound-attenuating region includes:
    (i) a plurality of resonator cells configured to attenuate sound; and
    (ii) a plurality of resonator cell openings, wherein each resonator cell opening of the plurality of resonator cell openings opens from a corresponding resonator cell toward the plurality of heat transfer-enhancing structures.

2. The sound-attenuating heat exchanger of claim 1, wherein each resonator cell opening of the plurality of resonator cell openings provides fluid communication between the corresponding resonator cell and the cooling fluid stream to attenuate sound within the cooling fluid stream.

3. The sound-attenuating heat exchanger of claim 1, wherein the plurality of resonator cell openings is defined within the base region, and wherein each resonator cell opening of the plurality of resonator cell openings at least one of:
    (i) extends through the base region; and
    (ii) extends between the first base side and the second base side.

4. The sound-attenuating heat exchanger of claim 1, wherein each resonator cell of the plurality of resonator cells defines at least one of:
    (i) a corresponding Helmholtz resonator for sound waves within the cooling fluid stream; and
    (ii) a corresponding quarter-wavelength resonator for sound waves within the cooling fluid stream.

5. The sound-attenuating heat exchanger of claim 1, wherein each resonator cell opening of the plurality of resonator cell openings is at least one of:
    (i) spaced-apart from the plurality of elongate fluid conduits; and
    (ii) fluidly isolated from the plurality of elongate fluid conduits.

6. The sound-attenuating heat exchanger of claim 1, wherein at least two resonator cell openings of the plurality of resonator cell openings opens from the corresponding resonator cell toward the plurality of heat transfer-enhancing structures.

7. The sound-attenuating heat exchanger of claim 1, wherein the plurality of heat transfer-enhancing structures includes at least one of:
    (i) a plurality of projections;
    (ii) a plurality of pins;
    (iii) a plurality of posts;
    (iv) a plurality of sheet-like projections;
    (v) a plurality of fins; and
    (vi) a plurality of dimples.

8. The sound-attenuating heat exchanger of claim 1, wherein an interior volume of each resonator cell of the plurality of resonator cells is in fluid communication with the cooling fluid stream only via a single corresponding resonator cell opening of the plurality of resonator cell openings.

9. A jet engine installation, comprising:
a fan;
a fan housing;
a turbine assembly mechanically coupled to, and configured to rotate with, the fan;
a turbine housing at least partially surrounding the turbine assembly;
a nacelle at least partially surrounding the fan, the turbine assembly, and the turbine housing; and
the sound-attenuating heat exchanger of claim 1.

10. An aircraft including the jet engine installation of claim 9.

11. The sound-attenuating heat exchanger of claim 1, wherein the plurality of heat transfer-enhancing structures includes a plurality of fins, and further wherein each resonator cell opening of the plurality of resonator cell openings is defined within the base region and extends between the first base side and the second base side.

12. The sound-attenuating heat exchanger of claim 11, wherein each resonator cell of the plurality of resonator cells defines at least one of:
(i) a square transverse cross-sectional shape;
(ii) a squircular transverse cross-sectional shape;
(iii) a rectangular transverse cross-sectional shape; and
(iv) a hexagonal transverse cross-sectional shape.

13. The sound-attenuating heat exchanger of claim 11, wherein each elongate fluid conduit of the plurality of elongate fluid conduits extends:
(i) along an at least substantially linear fluid conduit trajectory; and
(ii) at least partially between adjacent pairs of resonator cells of the plurality of resonator cells.

14. The sound-attenuating heat exchanger of claim 11, wherein the plurality of resonator cell openings includes a plurality of holes.

15. The sound-attenuating heat exchanger of claim 14, wherein each hole of the plurality of holes extends between a corresponding adjacent pair of elongate fluid conduits of the plurality of elongate fluid conduits.

16. The sound-attenuating heat exchanger of claim 14, wherein each hole of the plurality of holes extends into only one corresponding resonator cell of the plurality of resonator cells.

17. The sound-attenuating heat exchanger of claim 11, wherein the plurality of resonator cell openings is defined by a porous region of the base region.

18. The sound-attenuating heat exchanger of claim 17, wherein the porous region extends between a corresponding adjacent pair of elongate fluid conduits of the plurality of elongate fluid conduits.

19. The sound-attenuating heat exchanger of claim 11, wherein at least one of:
(i) the plurality of resonator cells and the plurality of elongate fluid conduits are at least partially interleaved;
(ii) the plurality of resonator cells is arranged in-between corresponding elongate fluid conduits of the plurality of elongate fluid conduits; and
(iii) a depth of the plurality of elongate fluid conduits is at least substantially equal to a depth of the plurality of resonator cells.

20. The sound-attenuating heat exchanger of claim 19, wherein each resonator cell of the plurality of resonator cells defines at least one of:
(i) a polygonal transverse cross-sectional shape;
(ii) a hexagonal transverse cross-sectional shape;
(iii) a square transverse cross-sectional shape;
(iv) a rectangular transverse cross-sectional shape;
(v) a circular transverse cross-sectional shape;
(vi) a squircular transverse cross-sectional shape; and
(viii) an elliptical transverse cross-section shape.

21. A method of exchanging heat and attenuating sound within a sound-attenuating heat exchanger, the method comprising:
flowing a cooling fluid stream through a plurality of heat transfer-enhancing structures that extends from a first base side of a base region of the sound-attenuating heat exchanger;
receiving, into a plurality of resonator cells of a sound-attenuating region of the sound-attenuating heat exchanger and via a plurality of resonator cell openings of the sound-attenuating heat exchanger, a sound wave that propagates within the cooling fluid stream, wherein the sound-attenuating region is positioned on a second base side of the base region, which is opposed to and faces away from the first base side of the base region, and further wherein each resonator cell opening of the plurality of resonator cell openings opens from a corresponding resonator cell of the plurality of resonator cells and toward the plurality of heat transfer-enhancing structures;
attenuating the sound wave within the sound-attenuating region;
receiving, with a plurality of elongate fluid conduits that is at least partially bounded by a planar region of the second base side that faces away from the first base side, a cooled fluid stream;
exchanging thermal energy between the cooling fluid stream and the cooled fluid stream within the sound-attenuating heat exchanger; and
maintaining fluid separation between the cooling fluid stream and the cooled fluid stream within the sound-attenuating heat exchanger.

* * * * *